US009223499B2

(12) United States Patent
Johansson

(10) Patent No.: US 9,223,499 B2
(45) Date of Patent: Dec. 29, 2015

(54) COMMUNICATION DEVICE HAVING A USER INTERACTION ARRANGEMENT

(75) Inventor: Fredrik Johansson, Malmo (SE)

(73) Assignee: Sony Mobile Communications AB, Lund (SE)

( * ) Notice: Subject to any disclaimer, the term of this patent is extended or adjusted under 35 U.S.C. 154(b) by 269 days.

(21) Appl. No.: 13/528,939

(22) Filed: Jun. 21, 2012

(65) Prior Publication Data

US 2013/0002604 A1 Jan. 3, 2013

Related U.S. Application Data

(60) Provisional application No. 61/502,367, filed on Jun. 29, 2011.

(30) Foreign Application Priority Data

Jun. 29, 2011 (EP) ..................................... 11171965

(51) Int. Cl.
| G06F 3/041 | (2006.01) |
| G06F 3/0488 | (2013.01) |
| G06F 3/0489 | (2013.01) |
| G06F 3/0481 | (2013.01) |

(52) U.S. Cl.
CPC ........ G06F 3/04886 (2013.01); G06F 3/04812 (2013.01); G06F 3/04895 (2013.01); *G06F 2203/04101* (2013.01); *G06F 2203/04108* (2013.01)

(58) Field of Classification Search
CPC . G06F 3/048; G06F 3/04842; G06F 3/04886; G06F 3/0418; G06F 3/044; G06F 3/02; G06F 2203/04108
USPC .................................................. 345/173, 174
See application file for complete search history.

(56) References Cited

U.S. PATENT DOCUMENTS

| 6,073,036 | A | * | 6/2000 | Heikkinen et al. .......... 455/550.1 |
| 7,443,316 | B2 | * | 10/2008 | Lim .................................. 341/22 |
| 7,653,883 | B2 | * | 1/2010 | Hotelling et al. .............. 715/863 |
| 2002/0196238 | A1 | * | 12/2002 | Tsukada et al. ................ 345/173 |
| 2006/0161846 | A1 | * | 7/2006 | Van Leeuwen ............... 715/702 |
| 2009/0254855 | A1 | | 10/2009 | Kretz et al. |
| 2009/0289914 | A1 | * | 11/2009 | Cho .............................. 345/173 |
| 2010/0066695 | A1 | * | 3/2010 | Miyazaki ....................... 345/173 |
| 2010/0095206 | A1 | * | 4/2010 | Kim .............................. 715/702 |
| 2011/0063224 | A1 | * | 3/2011 | Vexo et al. ..................... 345/168 |

FOREIGN PATENT DOCUMENTS

| DE | 103 10 794 A1 | 9/2004 |
| WO | 2010/083820 A1 | 7/2010 |

OTHER PUBLICATIONS

Extended European Search Report and European Search Opinion, corresponding to EP 11 17 1965, completion date Dec. 1, 2011.

* cited by examiner

*Primary Examiner* — Stephen Sherman
(74) *Attorney, Agent, or Firm* — Renner, Otto, Boisselle & Sklar, LLP

(57) ABSTRACT

The invention relates to a user interaction arrangement for interaction with a user using a pointing object. The arrangement comprises: a detector for detecting position of said object, a controller for computing a distance of said object to a surface of a display, and an image generating part for generating an image on said surface of display. The controller is further configured to compute a position on said surface based on said position and distance of said object, and the arrangement further comprises an image generating part configured to generate a dynamic guiding image on said surface of display based on said position and distance.

11 Claims, 5 Drawing Sheets

COMMUNICATION DEVICE HAVING A USER INTERACTION ARRANGEMENT

TECHNICAL FIELD

Implementations described herein relate generally to communication devices, and more particularly, to communication devices that may provide detection of an object in vicinity and execute operations based on the detection.

BACKGROUND

Devices, such as handheld mobile communication devices, conventionally include input arrangements that provide some form of feedback to a user indicating that an action has been detected by the communication device. These are usually used in for example keystroke.

Three-dimensional sensing in a volume above the display of a device to detect gesture together with suitable user interface (UI) is supposed to become popular. The UI may be 3D as well and also be used together with a 3D display or a projector.

One method is to sense an object, e.g. a users hand, in a 3D volume is to use capacitive or electric field sensing. FIG. 1 illustrates a device 150 for capacitive and electric field sensing based on transmitting a signal 10 by means of one or several electrodes 151 and then receiving the response with another electrode(s) 152. The electrodes may be arranged behind a display layer 153 and controlled by a controller 154. If an object is close enough to the touch surface, a change in the capacitive coupling between the electrodes and the ground will be detected as the received signal strength will change.

One problem with the data input (text, drawing, and control) on small and/or medium sized touch sensitive screens, is the precision. Specially, for example in case of text input precision is necessary because of the narrow input elements (keys).

SUMMARY

One object of the present invention is to solve the above mentioned problem and also present an enhanced input method.

Thus, a user interaction arrangement for interaction with a user using a pointing object is provided. The arrangement comprises: a detector for detecting position of said object, a controller for computing a distance of said object to a surface of a display, and an image generating part for generating an image on said surface of display. The controller is further configured to compute a position on said surface based on said position and distance, and the arrangement further comprises an image generating part configured to generate a dynamic guiding image on said surface of display based on said position and distance. The dynamic guiding image has a varying characteristic depending on said the distance. The characteristic is one or several of size, color or contrast. The dynamic guiding image reduces in size when the distance reduces. The arrangement may comprise a capacitive electric field generator and receiver. The arrangement may be for use in a mobile terminal having a touch sensitive display.

The invention also relates to an electric device comprising a display, a communication portion and a user interaction arrangement comprising: at least one transmitter for generating a signal, the arrangement being configured to detect a pointing object for interaction with said device, a controller for computing a distance of said object to said display, an image generating part for generating an image on said display. The controller is further configured to compute a position on said display based on said position and distance, and the arrangement further comprises an image generating part configured to generate a dynamic guiding image on said display based on said position and distance.

The device may be one of a mobile communication terminal, a camera, a global positioning system (GPS) receiver; a personal communications system (PCS) terminal, a personal digital assistant (PDA); a personal computer, a home entertainment system or a television screen. The object is a finger or stylus. The interaction is information input into said device. The image generator further generates a keyboard.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the embodiments.

Exemplary implementations of the embodiments will be described in the context of a mobile communication terminal. It should be understood that a mobile communication terminal is an example of a device that can employ a keypad consistent with the principles of the embodiments and should not be construed as limiting the types or sizes of devices or applications that can use implementations of providing position on a. A "device" as the term is used herein, is to be broadly interpreted to include devices having ability for 3D detection screen, such as a camera (e.g., video and/or still image camera) screen, and/or global positioning system (GPS) receiver; a personal communications system (PCS) terminal that may combine a cellular radiotelephone with data processing; a personal digital assistant (PDA); a laptop; and any other computation device capable of detecting a remote object, such as a personal computer, a home entertainment system, a television, etc. The term 3D sensing or detection as used herein relates to ability of detecting an object remotely in vicinity of the device using a radio, electromagnetic or optical detection signal.

The invention generally relates to using a signal for detecting a remote object, such as a finger or stylus, close to a screen and providing a user with a detailed hit zone information. The term hit zone as used herein relates to an area on, for example a virtual display, intended to be touched by the object.

Figure 2:
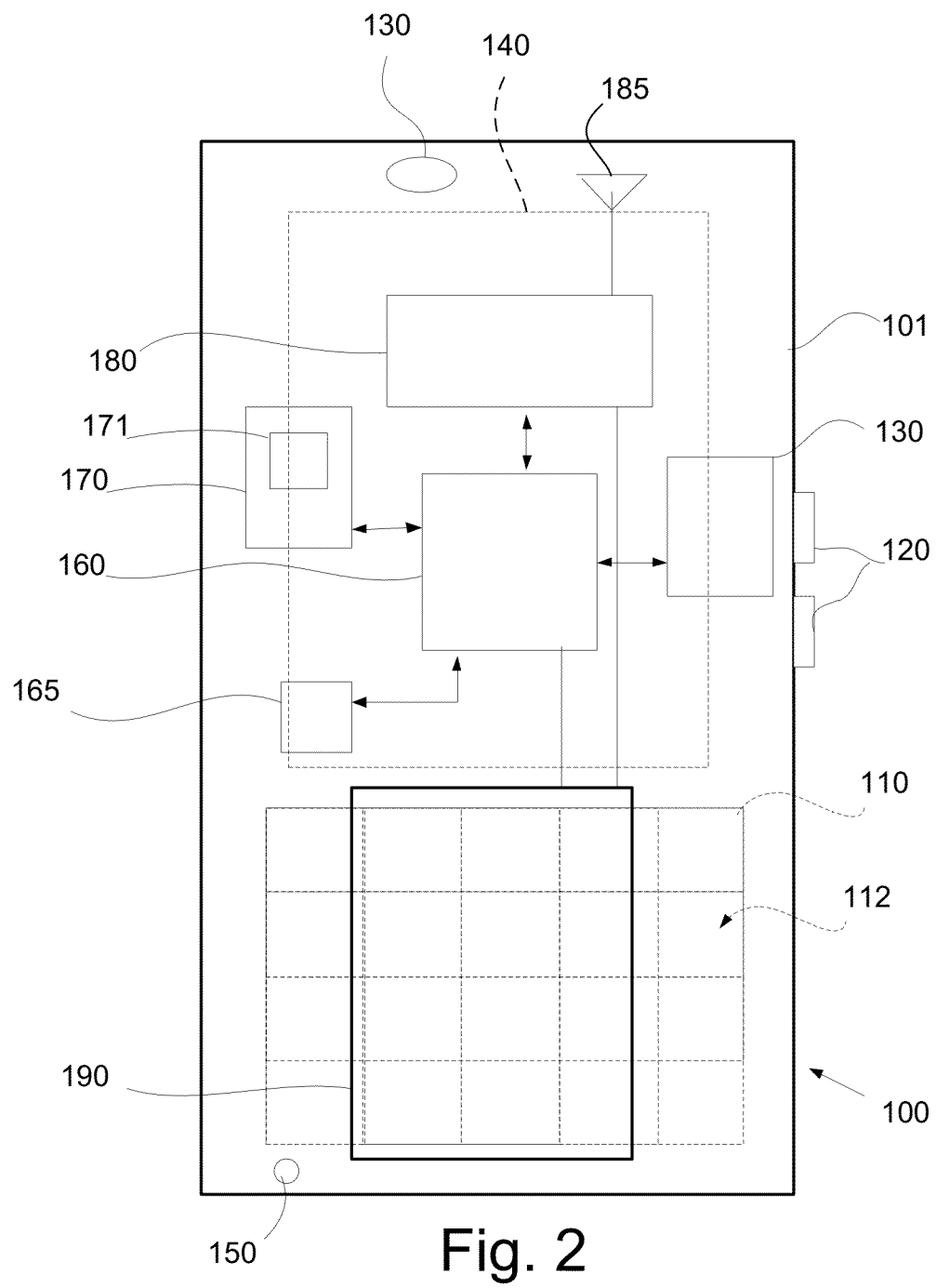
FIG. 2 is a diagram of an exemplary implementation of a mobile terminal.

FIG. 2 is a diagram of an exemplary implementation of a mobile terminal consistent with the principles of the invention. Mobile terminal 100 (hereinafter terminal 100) may be a mobile communication device. As used herein, a "mobile communication device" and/or "mobile terminal" may include a radiotelephone; a personal communications system (PCS) terminal that may combine a cellular radiotelephone with data processing, a facsimile, and data communications capabilities; a personal digital assistant (PDA) that can include a radiotelephone, pager, Internet/intranet access, web browser, organizer, calendar, and/or global positioning system (GPS) receiver; and a laptop and/or palmtop receiver or other appliance that includes a radiotelephone transceiver.

The terminal 100, exemplified as a mobile phone, may include a housing 101, input area 110, control keys 120, speaker 130, display 140, and microphones 150. Housing 101 may include a structure configured to hold devices and components used in terminal 100. For example, housing 101 may be formed from plastic, metal, or composite and may be configured to support input area 110, control keys 120, speaker 130, display 140 and microphones 150. The input area may be physical structure comprising a number of keys or may be integrated with the display in form of a touchscreen. The term "touch screen" as used herein implies a technology that may sense an object close to a surface of the screen or touching the surface of the screen.

The input area 110 may include devices and/or logic that can be used to display images to a user of terminal 100 and to receive user inputs in association with the displayed images. For example, a number of keys 112 may be displayed via input area 110 on the display. Implementations of input area 110 may be configured to receive a user input when the user interacts with keys 112. For example, the user may provide an input to input area 110 directly, such as via the user's finger, or via other devices, such as a stylus. User inputs received via area 110 may be processed by components or devices operating in terminal 100.

In one implementation, the input area 110 may be a virtual keypad generated on the display. In one embodiment, character information associated with each of keys 112 may be displayed via a liquid crystal display (LCD).

Functions of the control keys 120, display 140, and speaker 130, microphone 150 are assumed well known for a skilled person and not described in detail.

As shown in FIG. 2, terminal 100 may further include processing logic 160, storage 165, user interface logic 170, which may include keypad logic (not shown) and input/output (I/O) logic 171, communication interface 180, antenna assembly 185, and power supply 190.

Processing logic 160 may include a processor, microprocessor, an application specific integrated circuit (ASIC), field programmable gate array (FPGA), or the like. Processing logic 160 may include data structures or software programs to control operation of terminal 100 and its components. Implementations of terminal 100 may use an individual processing logic component or multiple processing logic components (e.g., multiple processing logic 160 devices), such as processing logic components operating in parallel. Storage 165 may include a random access memory (RAM), a read only memory (ROM), a magnetic or optical disk and its corresponding drive, and/or another type of memory to store data and instructions that may be used by processing logic 160.

User interface logic 170 may include mechanisms, such as hardware and/or software, for inputting information to terminal 100 and/or for outputting information from terminal 100.

Keypad logic, if implemented, may include mechanisms, such as hardware and/or software, used to control the appearance of input area 110 (real or displayed) and to receive user inputs via input area. For example, keypad logic may change displayed information associated with keys using an LCD display. I/O logic 171 is described in greater detail below with respect to FIG. 3.

Input/output logic 171 may include hardware or software to accept user inputs to make information available to a user of terminal 100. Examples of input and/or output mechanisms associated with input/output logic 171 may include a speaker (e.g., speaker 130) to receive electrical signals and output audio signals, a microphone (e.g., microphone 150) to receive audio signals and output electrical signals, buttons (e.g., control keys 120) to permit data and control commands to be input into terminal 100, and/or a display (e.g., display 140) to output visual information.

Communication interface 180 may include, for example, a transmitter that may convert base band signals from processing logic 160 to radio frequency (RF) signals and/or a receiver that may convert RF signals to base band signals. Alternatively, communication interface 180 may include a transceiver to perform functions of both a transmitter and a receiver. Communication interface 180 may connect to antenna assembly 185 for transmission and reception of the RF signals. Antenna assembly 185 may include one or more antennas to transmit and receive RF signals over the air. Antenna assembly 185 may receive RF signals from communication interface 180 and transmit them over the air and receive RF signals over the air and provide them to communication interface 180.

Power supply 190 may include one or more power supplies that provide power to components of terminal 100.

As will be described in detail below, the terminal 100, consistent with the principles described herein, may perform certain operations relating to providing inputs via interface area 110 or entire display in response to user inputs or in response to processing logic 160. Terminal 100 may perform these operations in response to processing logic 160 executing software instructions of an output configuration/reprogramming application contained in a computer-readable medium, such as storage 165. A computer-readable medium may be defined as a physical or logical memory device and/or carrier wave.

The software instructions may be read into storage 165 from another computer-readable medium or from another device via communication interface 180. The software instructions contained in storage 165 may cause processing logic 160 to perform processes that will be described later. Alternatively, hardwired circuitry may be used in place of or in combination with software instructions to implement processes consistent with the principles described herein. Thus, implementations consistent with the principles of the embodiments are not limited to any specific combination of hardware circuitry and software.

Figure 3:
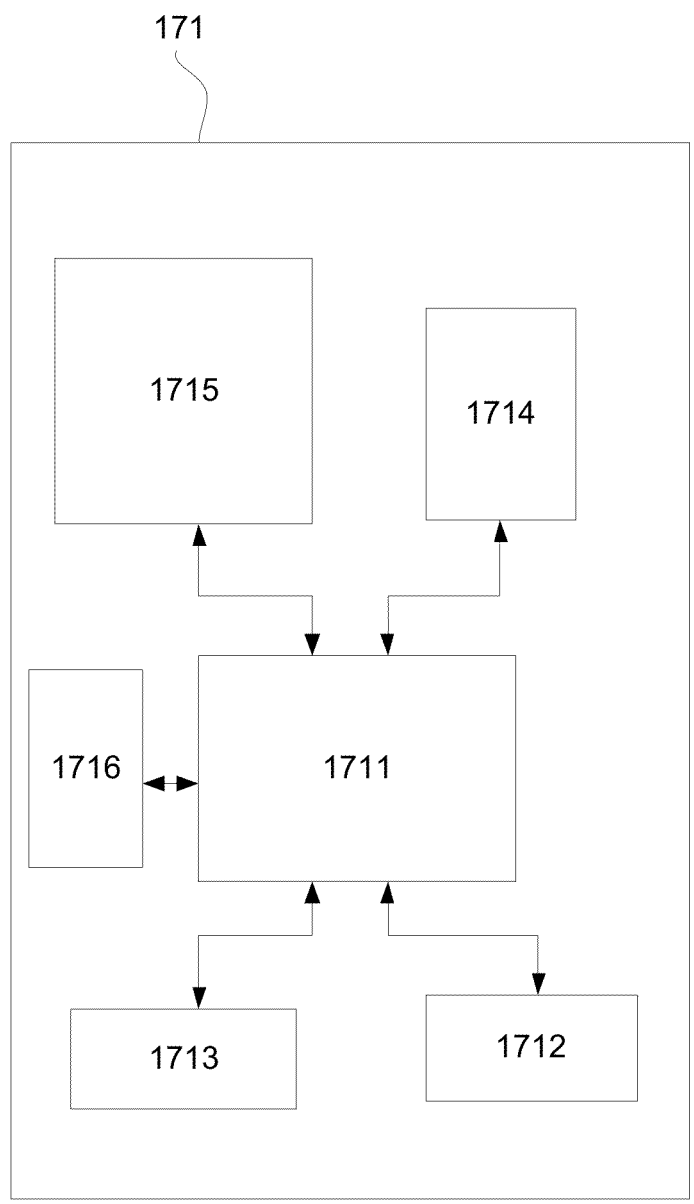
FIG. 3 illustrates an exemplary functional diagram of the logic of a device according to present invention.

FIG. 3 illustrates an exemplary functional diagram of the I/O logic 171 of FIG. 2 consistent with the principles of the embodiments. I/O logic 171 may include control logic 1711, display logic 1712, illumination logic 1713, position sensing logic 1714 and zooming logic and electrode (sensor) controller logic 1716, according to the invention.

Control logic 1711 may include logic that controls the operation of display logic 1712, and receives signals from position sensing logic 1714. Control logic 1711 may determine an action based on the received signals from position sensing logic 1714. The control logic 1711 may be implemented as standalone logic or as part of processing logic 160. Moreover, control logic 1711 may be implemented in hardware and/or software. The term position as used herein refers to a position in x, y and z-axes relative the display surface.

Display logic 1712 may include devices and logic to present information via display to a user of terminal 100. Display logic 1712 may include processing logic to interpret signals and instructions and a display device having a display area to provide information. Implementations of display logic 1712 may include a liquid crystal display (LCD) that includes, for example, biphenyl or another stable liquid crystal material. In this embodiment, keys 112 may be displayed via the LCD.

Illumination logic 1713 may include logic to provide backlighting to a lower surface of display and input area 110 in order to display information associated with keys 112. Illumination logic 1713 may also provide backlighting to be used with LCD based implementations of display logic 1712 to make images brighter and to enhance the contrast of displayed images. Implementations of illumination logic 1713 may employ light emitting diodes (LEDs) or other types of devices to illuminate portions of a display device. Illumination logic 1713 may provide light within a narrow spectrum, such as a particular color, or via a broader spectrum, such as full spectrum lighting. Illumination logic 1713 may also be used to provide front lighting to an upper surface of a display device that faces a user.

Position sensing logic 1714 may include logic that senses the position and/or presence of an object within input area 110. Implementations of position sensing logic 1714 are configured to sense the presence and location of an object in three dimensions, i.e. along X, Y and Z axes in a Cartesian coordinate system, where X and Y are along the plane of the display and Z perpendicular to the XY-plane. For example, position sensing logic 1714 may be configured to determine a location of a stylus or a finger of a user in the input area 110. Implementations of position sensing logic 1714 may use capacitive and/or resistive techniques to identify the presence of an object and to receive an input via the object.

Zooming logic 1715 may include mechanisms and logic to provide activation signal to a visual feedback element via control logic 1716, which when activated, provides a visual marking on the display. For example, zooming logic 1715 may receive a signal from the position sensing logic 1714 and in response to this signal, provide a signal to display controller to display, for example a crosshair, a color or contrast change, with different sizes or colors/contrasts.

Figure 1:
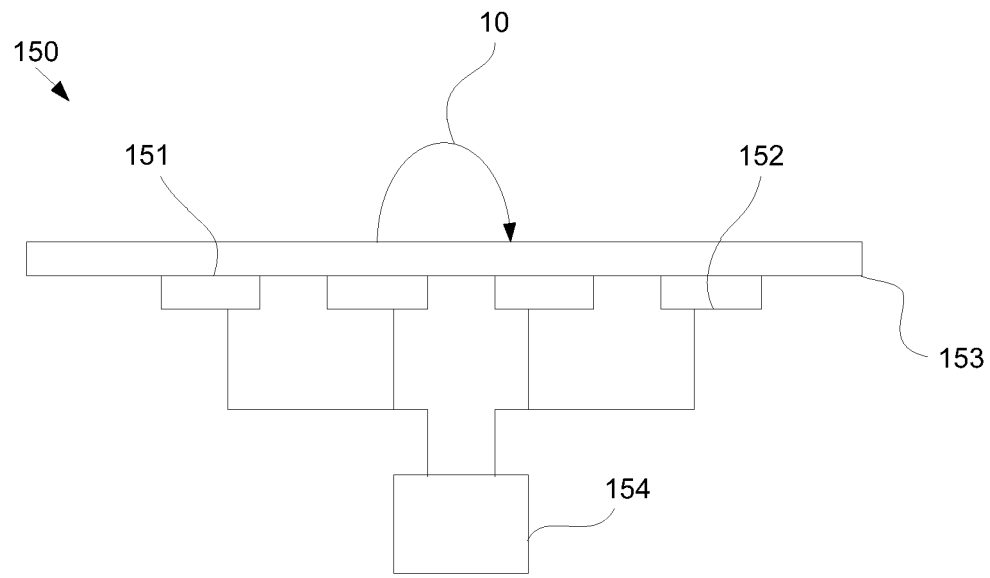
FIG. 1 is a diagram of a known object detection system.
Figure 4:
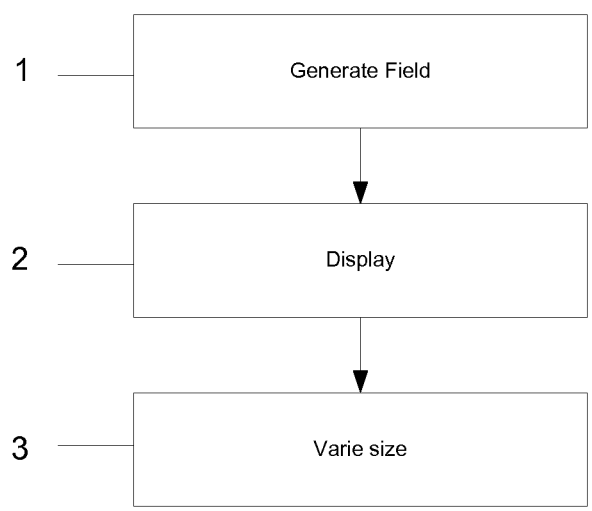
FIG. 4 is a flowchart of exemplary processing.

Returning now to FIG. 1 and in conjunction with FIG. 4, the electrodes 151 are controlled by a controller 154. The electrodes generate (1) electrical fields which can be effected by an object close enough to the detecting surface, a change in the capacitive coupling between the electrodes will be detected as the received signal strength will changes. By using, e.g. distance information from several electrodes xyz-coordinates of the object in the space above the electrodes can be determined. When the distance is determined the position of the object on the display is illustrated (2), e.g. using a crosshair. When the distance varies, the size of the crosshair is altered (3).

In one embodiment, a capacitive touch panel may include an insulating layer, a plurality of first dimensional conductive patterns, e.g. column conductive patterns, and a plurality of second dimensional conductive patterns, e.g. row conductive patterns. The column conductive patterns may be configured over an upper surface of the insulating layer and the row conductive patterns may be configured over a lower surface of the insulating layer. The column conductive patterns over the upper surface and the row conductive patterns over the lower surface form a vertical capacitance, and an ideal capacitance value may be obtained by adjusting the insulating layer. In addition, the column conductive patterns and the row conductive patterns may form horizontal capacitances respectively to achieve better detecting sensitivity. Therefore, a user touch may be sensed by detecting variance in capacitance values of the formed capacitance.

Clearly, other types of detection in a three-dimensional space may be used.

FIGS. 5a to 5f, illustrate one exemplary embodiment of the invention. A device, such as a mobile terminal 500, has a touch sensitive display 501 with ability to sense the distance of an object 502, such as a finger of a user. The display 501 is adopted to display a number of (virtual) keys 503, for example for inputting a text message. Of course, the teachings of the invention may be applied to any information input, such as drawing, control functions, etc. via a touch sensitive screen.

Figure 5A:
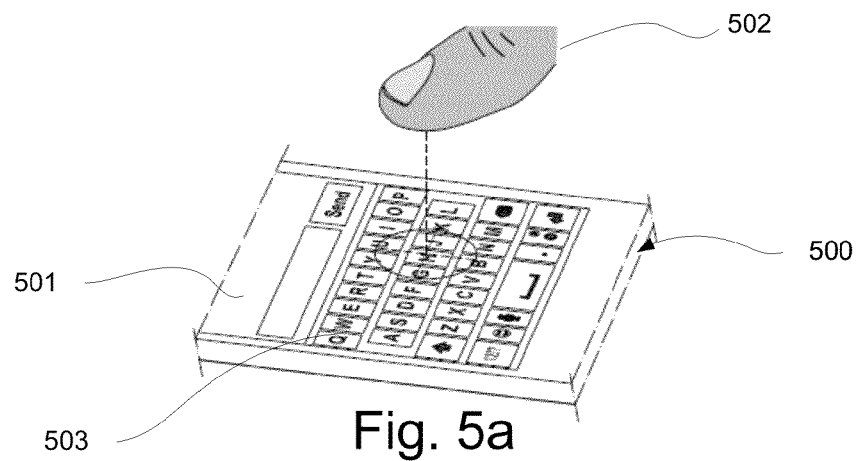
FIGS. 5a-5f are views of operation of a device according to the present invention.
Figure 5B:
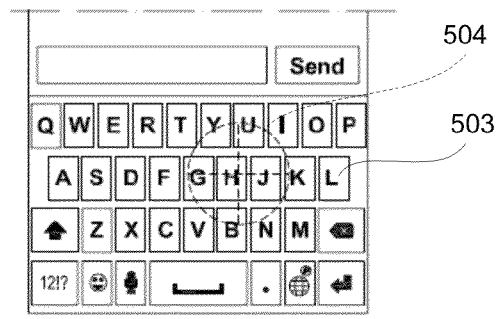

In FIG. 5a, the finger 502 of the user is above the display 501, over the virtual keyboard. In FIG. 5b, as the distance to the keys is long and the hit zone uncertain, a number of keys closes to the detected finger position are marked, e.g. using a crosshair 504, in this case covering "G", "H", "K", "B", "Y" and "U". The center of the crosshair 504 is determined to a center point of the sensed finger.

Figure 5C:
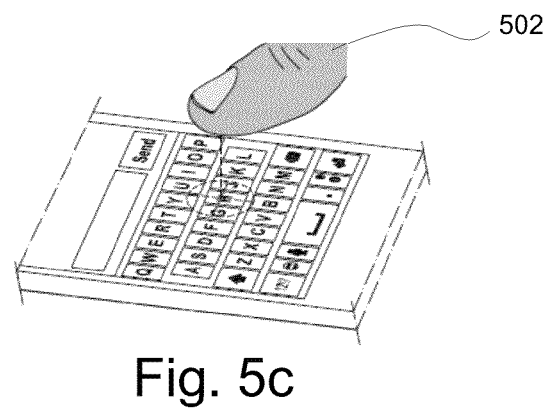
Figure 5D:
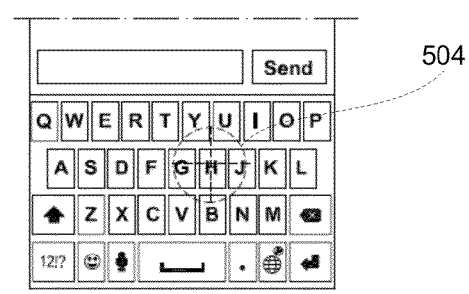

In FIG. 5c, the finger 502 is moved closer, decreasing the distance to the surface of the display. In FIG. 5d the crosshair size is reduced as the finger is moved closer and a more certain position on the display is determined. The crosshair is centred on key "H". It may now be possible to the user to determine if he/she is aiming at right key and move the finger and crosshair if not so.

Figure 5E:
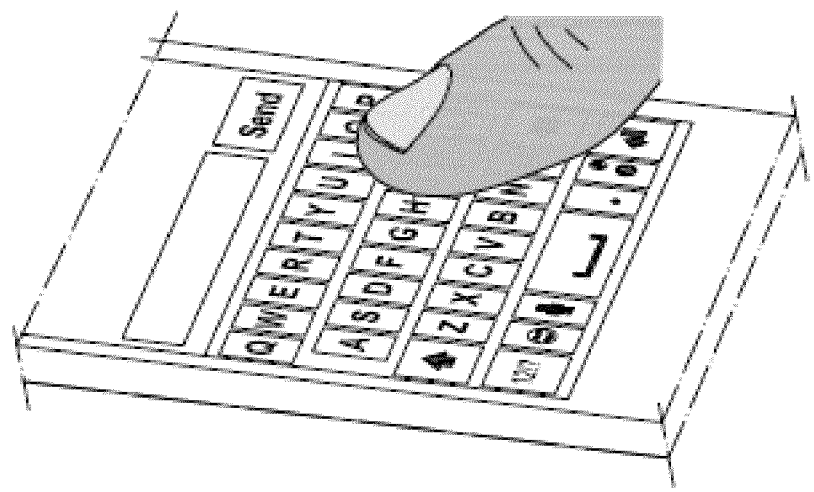
Figure 5F:
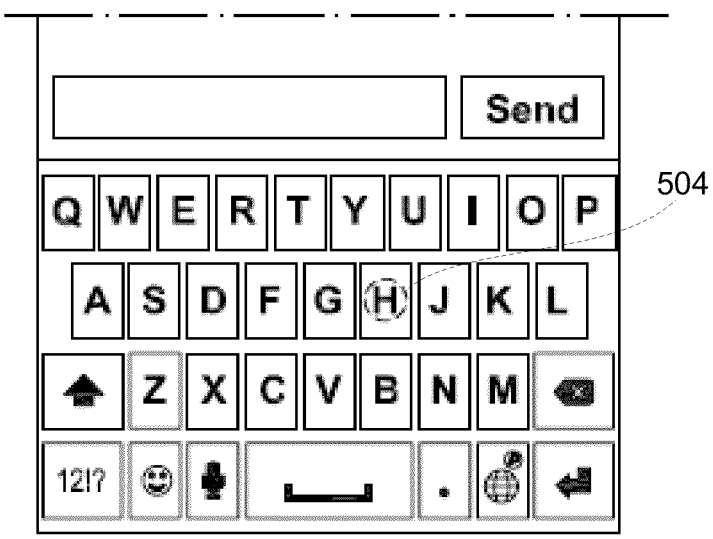

In FIG. 5e, the finger 504 is almost on the display and the and in FIG. 5f the size of the crosshair is reduced almost to size of a key, "H" in this case, and a more certain position on the display is determined.

The indicator change on the display may be quantified or leveled to avoid user experiencing "shaky" indicator. This means that the shape, size, and/or contrast change may be controlled in periods depending on the distance to the finger.

The foregoing description of preferred embodiments of the embodiments provides illustration and description, but is not intended to be exhaustive or to limit the embodiments to the precise form disclosed. Modifications and variations are possible in light of the above teachings or may be acquired from practice of the embodiments. While a series of acts has been described with regard to FIG. 5, the order of the acts may be modified in other implementations consistent with the principles of the embodiments. Further, non-dependent acts may be performed in parallel.

It will be apparent to one of ordinary skill in the art that aspects of the embodiments, as described above, may be implemented in many different forms of software, firmware, and hardware in the implementations illustrated in the figures. The actual software code or specialized control hardware used to implement aspects consistent with the principles of the embodiments is not limiting of the embodiments. Thus, the operation and behaviour of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as hardwired logic, an application specific integrated circuit, a field programmable gate array or a microprocessor, software, or a combination of hardware and software.

It should be emphasized that the term "comprises/comprising" when used in this specification and/or claims is taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A user interaction arrangement comprising:
    a detector for detecting a three-dimensional position of a pointing object, the three-dimensional position being defined along x, y and z axes in a Cartesian coordinate system, wherein the x and y axes are along a surface of a display substantially under the position of the pointing object and the z axis is perpendicular to the xy-plane;
    an image generating part for generating an image on the surface of the display substantially under the position of the pointing object; and
    a controller for computing a distance of the pointing object to the surface of the display based on a position of the pointing object along the z-axis and for computing a center point of the detected pointing object based on a position of the pointing object within the xy-plane, the controller being further configured to provide the image generating part with instructions to generate a dynamic guiding image having a center at the center point of the detected pointing object, said dynamic guiding image having a progressively variable characteristic that progressively varies over a detection range of the detector depending on the distance of the pointing object to the surface of the display, and said dynamic guiding image having an appearance deviating from the image generated on the surface of the display.

2. The arrangement of claim 1, wherein said characteristic is one or several of shape, size, color or contrast.

3. The arrangement of claim 1, wherein said dynamic guiding image changes shape, size, color or contrast when the distance reduces.

4. The arrangement according to claim 1, comprising a capacitive electric field generator and receiver.

5. The arrangement according to claim 1, for use in a mobile terminal having a touch sensitive display.

6. The arrangement according to claim 1, wherein said dynamic guiding image is a cross-hair.

7. An electric device comprising a display and a user interaction arrangement comprising:
    a detector for detecting position of a three-dimensional pointing object for interaction with said device, the three-dimensional position being defined along x, y and z axes in a Cartesian coordinate system, wherein the x and y axes are along a surface of the display substantially under the position of the pointing object and the z axis is perpendicular to the xy-plane,
    an image generating part for generating an image on the surface of the display,
    a controller for computing a distance of the pointing object to the surface of the display based on a position of the pointing object along the z-axis and for computing a center point of the detected pointing object based on a position of the pointing object within the xy-plane, the controller being further configured to provide the image generating part with instructions to generate a dynamic guiding image having a center at the center point of the detected pointing object, said dynamic guiding image having progressively variable characteristic that progressively varies over a detection range of the detector depending on the distance of the pointing object to the surface of the display, and said dynamic guiding image having an appearance deviating from the image generated on the surface of the display.

8. The device of claim 7, being one of a mobile communication terminal, a camera, a global positioning system (GPS) receiver; a personal communications system (PCS) terminal, a personal digital assistant (PDA); a personal computer, a home entertainment system or a television screen.

9. The device of claim 7, wherein said object is a finger or stylus.

10. The device of claim 7, wherein said interaction is information input into said device.

11. The device of claim 7, wherein said image generator further generates a keyboard.

* * * * *